US011210085B2

(12) United States Patent
Buecherl et al.

(10) Patent No.: US 11,210,085 B2
(45) Date of Patent: Dec. 28, 2021

(54) METHOD AND DEVICE FOR UPDATING SOFTWARE

(71) Applicant: Bayerische Motoren Werke Aktiengesellschaft, Munich (DE)

(72) Inventors: Gunther Buecherl, Olching (DE); Lena Dupper, Munich (DE); Johann Kratzer, Munich (DE); Michael Spiegler, Grosskarolinenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 80 days.

(21) Appl. No.: 16/782,185

(22) Filed: Feb. 5, 2020

(65) Prior Publication Data

US 2020/0174781 A1  Jun. 4, 2020

Related U.S. Application Data

(63) Continuation of application No. PCT/EP2018/079012, filed on Oct. 23, 2018.

(30) Foreign Application Priority Data

Nov. 17, 2017 (DE) .................. 10 2017 220 526.1

(51) Int. Cl.
*H04W 4/40* (2018.01)
*G06F 8/654* (2018.01)

(52) U.S. Cl.
CPC .............. *G06F 8/654* (2018.02); *H04W 4/40* (2018.02)

(58) Field of Classification Search
CPC .................... G06F 9/44; G06F 8/654
See application file for complete search history.

(56) References Cited

U.S. PATENT DOCUMENTS

| 7,979,854 B1* | 7/2011 | Borole ...................... G06F 8/65 |
| | | 717/172 |
| 2005/0027898 A1* | 2/2005 | Kuder ..................... H04L 12/12 |
| | | 710/15 |
| 2008/0221752 A1* | 9/2008 | Jager ..................... G06F 9/4411 |
| | | 701/33.4 |

(Continued)

FOREIGN PATENT DOCUMENTS

WO   WO 2014/088567 A1   6/2014

OTHER PUBLICATIONS

International Search Report (PCT/ISA/210) issued in PCT Application No. PCT/EP2018/079012 dated Feb. 13, 2019 with English translation (six (6) pages).

(Continued)

*Primary Examiner* — Jae U Jeon
(74) *Attorney, Agent, or Firm* — Crowell & Moring LLP

(57) ABSTRACT

A method and an apparatus for updating software for operating vehicle equipment are provided. The apparatus includes a control unit, having a first data store, and multiple pieces of vehicle equipment, each having a further data store, wherein the control unit is configured for storing a first segment of segmented updated software for operating a piece of vehicle equipment in the first data store, and for storing at least one part of the first segment in a second data store of a first piece of vehicle equipment of multiple pieces of vehicle equipment by shifting or copying from the first data store into the second data store.

11 Claims, 2 Drawing Sheets

(56) References Cited

U.S. PATENT DOCUMENTS

| | | | |
|---|---|---|---|
| 2008/0291276 A1* | 11/2008 | Randler | B62D 1/28 |
| | | | 348/149 |
| 2015/0007155 A1 | 1/2015 | Hoffman et al. | |
| 2016/0167921 A1* | 6/2016 | Kattainen | B66B 5/02 |
| | | | 187/247 |
| 2016/0323416 A1* | 11/2016 | Wolf | G06F 8/656 |
| 2016/0335073 A1* | 11/2016 | Hong | G06F 8/65 |
| 2017/0090902 A1 | 3/2017 | Bainville et al. | |
| 2017/0192770 A1 | 7/2017 | Ujiie et al. | |
| 2019/0392091 A1* | 12/2019 | Kliemann | G06F 30/20 |
| 2020/0104248 A1* | 4/2020 | Yim | G06F 11/3692 |

OTHER PUBLICATIONS

German-language Written Opinion (PCT/ISA/237) issued in PCT Application No. PCT/EP2018/079012 dated Feb. 13, 2019 (11 pages).

\* cited by examiner

METHOD AND DEVICE FOR UPDATING SOFTWARE

CROSS REFERENCE TO RELATED APPLICATIONS

This application is a continuation of PCT International Application No. PCT/EP2018/079012, filed Oct. 23, 2018, which claims priority under 35 U.S.C. § 119 from German Patent Application No. 10 2017 220 526.1, filed Nov. 17, 2017, the entire disclosures of which are herein expressly incorporated by reference.

BACKGROUND AND SUMMARY OF THE INVENTION

The invention relates to a method and a device for updating software for the operation of vehicle equipment.

By making use of wireless radio technologies it is becoming more and more common to use the facility to send software updates via a mobile radio connection, for example, as so-called "Over The Air" (OTA) software updates, to a vehicle so that the latter can use the received software update.

With the increasing size of these software updates the memory requirements in the vehicle for downloading these software updates also increases. From the prior art it is known to use various software update procedures. For example, the publication US 2017/0090902 A1 discloses a method for updating a target file, which is stored on a device, with an additional file.

An object of the invention is to create an improved method for updating software for operating vehicle equipment. A further object of the invention is to provide a corresponding improved device for updating software for operating vehicle equipment. Also, a further object of the invention is to provide an improved vehicle having such a device for updating software for operating vehicle equipment.

These objects are achieved by a method for updating software for operating vehicle equipment, a device for updating software for operating vehicle equipment, and by a vehicle equipped with such a device for updating software for operating vehicle equipment according to the claims of this invention.

A first aspect of the invention relates to a method for updating software for operating vehicle equipment, the method having the following steps:

storing a first segment of a segmented updated software for operating a first vehicle device of a plurality of vehicle devices in a first data memory of a central control device; and storing at least a portion of the first segment in a second data memory of the first vehicle device by moving or copying from the first data memory into the second data memory.

The method according to the invention allows an assembly consisting of any number of vehicle devices or their controllers to be updated with updated software via a central control device. The software packages are loaded into the central control device, stored there temporarily and distributed from there to the vehicle devices. The storage capacity of the first data memory of the central control device does not need to entirely correspond to the size of the updated software, since this is stored sequentially in segments in the first data memory. Only then will this be stored in the respective second data memory of the first vehicle device. On the one hand, this allows material costs to be saved, because the storage capacity of the first data memory can be reduced. On the other hand, the updating can be restricted to particular operating states of the vehicle device or the vehicle. If suitable operating states do not occur, the update operation can be paused or interrupted.

A software update within the meaning of the invention is at least one storable file segment, which has enhancements and/or optimizations of a particular current software version. Preferably, a software update is a straightforward update of the software. In addition, a software update can also be a software upgrade, which preferably comprises a higher-quality configuration or version of a software version. Also, the term software update may be understood to mean an update with additional new file segments and/or files.

A vehicle device within the meaning of the invention is a device which is configured to execute predefined instructions during the operation of a vehicle. In particular, this may be a vehicle device which is used in a driver assistance system, in the drive system, for the infotainment system or even in the suspension system.

A control device within the meaning of the invention is a device which at least partially controls the operation of a vehicle device, in particular by means of a processor, in particular a CPU.

A data memory within the meaning of the invention is a storage medium on which data are stored in digitized form. This is, in particular, a read-only memory, which is designed as a non-volatile memory for the permanent storage of data and is rewritable.

An operating state within the meaning of the invention is a predetermined state of a vehicle at a predetermined time. In particular, it may be an operating state in which the vehicle is stationary with the engine switched off and/or stationary with the engine running and/or while being driven.

A communication device within the meaning of the invention has at least one antenna which is designed to send and/or receive electromagnetic signals. In particular, the communication device enables a wireless transmission and/or reception of, for example, software updates or system states. A mobile radio connection is preferably used to transfer data. More preferably, a wired connection to a PC device can also be set up by means of the communication device.

A backend server within the meaning of the invention is a PC device which is configured for sending data to at least one receiver. The backend server preferably communicates with the control device of the vehicle via the communication device and sends a software update to the control device. The backend server preferably sends the software update to a plurality of vehicles, which in particular originate from the same production series.

An assembly of multiple vehicle devices within the meaning of the invention is a grouping and/or categorization of multiple vehicle devices based on their areas of application.

Copying within the meaning of the invention can be understood to mean that the content of a first data memory is mirrored in a second data memory, so that the first and second data memories contain the same content.

Moving within the meaning of the invention can be understood to mean that the content of a first data memory is moved into a second data memory, so that the second memory area has the content which was originally present in the first data memory and the first data memory has no or an undefined content. Moving can also be understood to mean so-called cutting and pasting.

In a preferred embodiment, the method has at least the following additional step:

joining the at least one part of the first segment with at least one second segment of the updated software and/or with a software already existing in the second data memory for operating the first vehicle device.

Preferably, it can thus be ensured that the updated software can be used in its combined form without the need to use the different segments of the updated software when running the software. This facilitates, in particular, the access to the software by the first vehicle device as a common construct without split segments, thereby simplifying the management of maintenance and the use of the updated software.

In a further preferred embodiment, the method has the following additional step:

storing at least a portion of the first and/or the second segment in a third data memory of a second vehicle device by moving or copying from the first data memory into the third data memory.

Preferably, an updated software can therefore also be transmitted to a second vehicle device so that, for example updates of language packs, which as a rule are at least essentially the same and/or similar in all vehicle devices which use language packs, can be transmitted to the vehicle devices. This preferably facilitates the distribution of updated software which is the same in the first and the second vehicle device. Further preferably, however, it can also be ensured that the central control device can manage an updated software for multiple vehicle devices in a simpler way.

In a further preferred embodiment, the method has the following additional step:

segmenting the updated software into at least the first and the second segment.

Preferably, this process step allows the updated software to be segmented as a function of the available storage space in the first data memory in such a way that the storage of the updated software is improved. In particular, a criterion can be included to provide a time-optimized and/or a storage-space-optimized segmentation of the updated software. This step is preferably executed directly by the control device, wherein a backend server can also perform this segmentation in advance so that the transmission of updated software itself takes place in the predetermined segments.

In a further preferred embodiment, the method has at least one of the following additional steps:

allocating the first and/or the second segment to the first and/or the second vehicle device;

testing the first data memory and/or the second data memory and/or the third data memory to determine whether the storage capacity is sufficient for storing the first and/or the second segment; and changing the access by the first vehicle device and/or the second vehicle device to the software which is updated by means of the software update.

Preferably, the allocation is performed in order to transfer the segments of the updated software to the respective vehicle device in a targeted way and store them in its data memory. In particular, this process step is carried out by the control device itself so that the management of the updated software is executed centrally.

Further preferably, the testing ensures that enough free storage space is always available on the first and/or the second and/or the third data memory.

In particular, by changing the access to the software update it is ensured that the updated software is activated on the first and/or the second vehicle device, so that the vehicle devices execute the updated software, starting from the end of this process step. It may preferably be possible and/or necessary during this modification step for the vehicle to be in an operating state in which the vehicle is not in road traffic, in particular is at a standstill without the engine running.

In a further preferred embodiment of the method at least a portion of the first and/or the second segment is an updated file. It can therefore be ensured that the software update is carried out by means of at least one updated file, so that preferably only files instead of file segments are updated.

In a further preferred embodiment, the method is carried out during at least one predetermined operating state of the control device and/or the first vehicle device. Thus, it can preferably be ensured that a software update is enabled only in predetermined operating states of the control device and/or the first vehicle device. Preferably, a software update is also possible while driving and thus during the operation of the vehicle, so that no delays to the operation of the vehicle occur for the driver.

In a further preferred embodiment, the method has the following additional step:

comparing the operating state of the control device and/or of the first vehicle device with the predetermined operating state; and pausing the storage operation of the first data memory of the control device and/or the second data memory of the first vehicle device, if the current operating state of the control device and/or the first vehicle device do/does not correspond to the predetermined operating state.

Preferably, by comparing the operating state of the control device and/or the first vehicle device it is possible to ensure that the software update is performed only when the control device and/or the vehicle device is/are in a predetermined operating state. If the operating state of the control device and/or the vehicle device should change during the software update, then the updating process can be paused in order to avoid any disruption during the operating process of the vehicle.

In a further preferred embodiment of the method at least a portion of the first and/or the second segment is at least one updated file. This means that a processing effort required for the segments can preferably be reduced, since it is not file segments that are updated, but whole files.

In a further preferred embodiment of the method the storage of the first and/or second segment, in particular a part of the first segment and a part of the second segment, takes place independently of a predetermined arrangement and/or sequence of the segments. It can thus be ensured that the method is executed depending on a time-optimized and/or memory-optimized processing of the segments of the updated software.

A secondary aspect of the invention relates to a device for updating software for operating vehicle equipment, having:

a control device which has a first data memory; and a plurality of vehicle devices, each of which has an additional data memory;

wherein the control device is configured in such a way as to store a first segment of a segmented updated software for operating a vehicle device in the first data memory and to store at least a portion of the first segment in a second data memory of a first vehicle device of the plurality of vehicle devices by moving or copying from the first data memory into the second data memory.

An advantage of this is that a segmented updated software is processed in a central control device, in order then to distribute the segments over at least one vehicle device and store them therein.

In a preferred embodiment of the device at least the first and/or the second data memory is/are implemented as a non-volatile memory, preferably a flash memory or hard disk memory. It can thus be ensured that the data which are located on the data memory, in particular the updated software, will not be lost by shutting off the power supply to the data memory.

In a further preferred embodiment of the device, the device has a communication device, by means of which at least one segment of the updated software can be wirelessly received. This ensures that the software update can also be received while the vehicle is being driven, so that the unrestricted operation of the vehicle is guaranteed. It is thus also preferably possible to avoid the need for the vehicle to visit a workshop during which the software update is installed on the vehicle via a wired connection, thus resulting in time and cost savings.

In a further preferred embodiment of the device the plurality of vehicle devices are assigned to a functional assembly, preferably in relation to driver assistance and/or communication and/or drive unit, in particular, all vehicle devices are assigned to an entire assembly of a vehicle.

It can thereby preferably be ensured that a predetermined segment of the updated software can be assigned to an assembly of multiple vehicle devices and this predetermined segment can thus be transferred to this assembly. This simplifies, in particular, the management of the updated software, in particular its segments.

A third aspect of the invention relates to a vehicle having at least one device for updating software for operating vehicle devices in accordance with the second aspect.

The features and advantages described below in relation to the first aspect of the invention and its advantageous embodiment also apply to the second and third aspect of the invention and its advantageous embodiment, and vice versa.

Further features, advantages and application possibilities of the invention are derived from the following description in connection with the figures, in which the same reference numerals are used consistently for identical or corresponding elements of the invention. Shown are, at least partially schematically:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
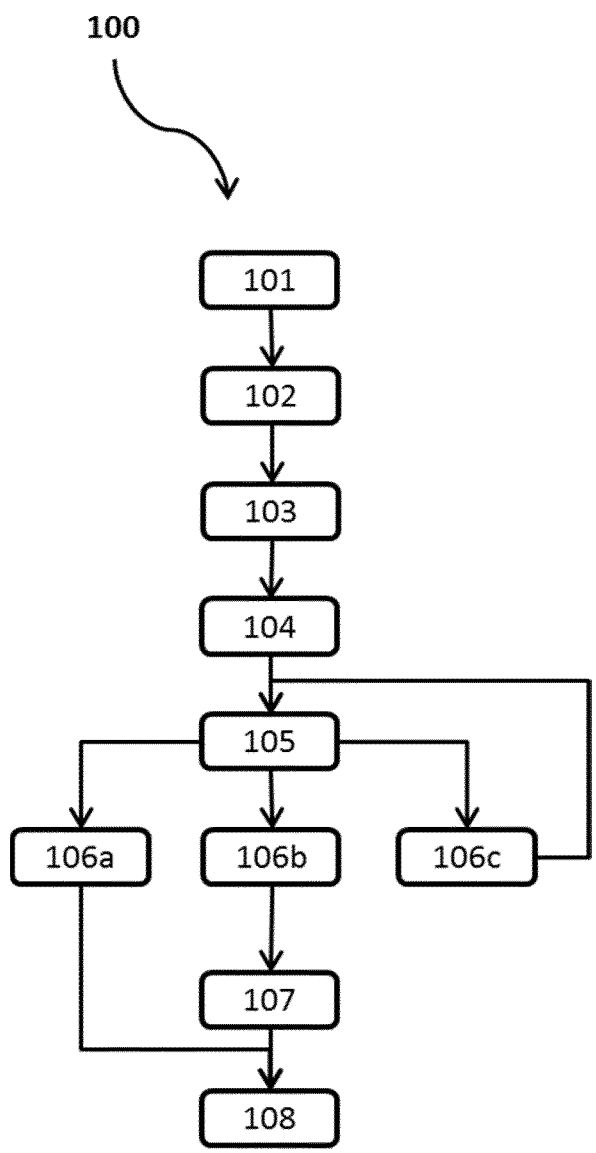
FIG. 1 illustrates an exemplary embodiment of a method according to the invention for updating software for operating vehicle devices.

FIG. 1 shows an exemplary embodiment of a method 100 according to the invention for updating software for operating vehicle devices 2, 3.

In a first process step 101, an updated software is segmented into at least one first and one second segment 12, 13. It can thus be ensured that the software update is carried out in a time-optimized and/or memory-optimized manner. In particular, for example in the case of a slow transfer rate of the software update the segmentation of the software into smaller segments can be advantageous, since storage operations can be performed in parallel with the download. On the other hand, for example in the case of a high data transfer rate it may be advantageous to divide the software update into a small number of larger segments, in order to process them during storage operations.

Preferably, during and/or after the segmentation of the first and second segment 12, 13 a rule and/or protocol is created, in particular by the backend server, which is used by the central control device 4 to distribute the segments over the vehicle devices. This can be used to ensure that the central control device 4 is informed already before and/or during the download of the segments as to which segment is associated with which vehicle device.

In a further process step 102 the first data memory 8 and/or the second data memory 9 and/or the third data memory 10 is/are tested to determine whether or not the storage capacity is sufficient for storing the first and/or the second segment 12, 13. It can therefore preferably be guaranteed that sufficient storage space is always available on the first and/or second and/or third data memory 8, 9, 10.

In a third process step 103, the first segment 12 of the segmented updated software, which is used to operate a first vehicle device 2 of a plurality of vehicle devices 2, 3, is stored in a first data memory 8 of a central control device 4. In this connection, it is preferable that the segments of the updated software are stored in a central control device 4 and the management or distribution of these segments to vehicle devices 2, 3 is centrally controlled.

In a further process step 104 the first and/or second segment is/are assigned to the first and/or a second vehicle device 2, 3. It can thus be guaranteed that the updated software is also intended for multiple vehicle devices 2, 3, so that, in particular, management effort can be reduced. In addition, therefore, the first segment and/or the second segment, which is intended for the first and the second vehicle device 2, 3, can also be sent to both vehicle devices 2, 3 and stored in the data memories 9, 10 thereof so that the updated software only needs to be transferred and processed by the control device 4 once.

In a further process step 105 the operating state of the control device 4 and/or of the first vehicle device 2 and/or the second vehicle device 3 is compared with a predetermined operating state. This is intended to ensure that the software update is executed only if no impairment to the driving operation of the vehicle 1 can be guaranteed. It is preferable to ensure that safety-critical systems, such as those relating to driver assistance, can still be operated without any restrictions due to the software update. More preferably, the method 100 is carried out during at least one predetermined operating state of the control device 4 and/or the first vehicle device 2. In particular, this process step 104 is also carried out even before storing 103 the first segment 12 of the segmented updated software in the first data memory 8 of the central control device 4.

In a process step 106a at least a portion of the first or the second segment 12, 13 is stored in a third data memory 10 of a second vehicle device 3 by moving or copying from the first data memory 8 into the third data memory 10. It is therefore preferably possible that the first segment 12 of the updated software can be assigned to the first vehicle device 2 and the second segment 13 of the updated software can be assigned to the second vehicle device 3 and vice versa.

In a process step 106b at least a portion of the first segment 12 is stored in the second data memory 9 by moving or copying from the first data memory 8. In particular, by means of the move operation it can be guaranteed that free space is available again in the first data memory 8, since in this process step the data are no longer present in the first data memory 8 as a result of the move. Preferably, an additional deletion of the first data memory 8, in particular of at least one memory area of the first data memory 8, can be performed in order to speed up the time taken by a storage operation of a new segment in the first data memory 8.

The copying 106b of the at least one part of the first segment preferably enables a situation in which in the event of an aborted storage operation into the second data memory 9 of the first vehicle device 2 a backup copy is available in the central control device 4, which can be restored to the second data memory 9 of the first vehicle device 2. Thus, for example in the event of a power failure that takes place during the storage operation into the second data memory 9 of the first vehicle device 2, a redundant segment version is available in the first data memory 8 of the control device 4.

In a process step 106c, the storage operation from the first data memory 8 into the second data memory 9 of the first vehicle device 2 and/or into the third data memory 10 of the second vehicle device 3 is paused if the current operating state of the control device 4 and/or the first vehicle device 2 and/or the second vehicle device does not correspond to a pre-determined operating state. It can preferably be thereby ensured that the operation of the vehicle 1 and, in particular, safety-critical process steps of the vehicle 1, can be executed unrestricted. After performing this step, in particular after a predetermined time interval or after an interrupt which occurs during a change in the operating state of the control device 4 and/or the first vehicle device 2, the comparison of the operating states 104 is preferably executed again.

In a process step 107 at least one part of the first segment 12 is joined with at least one part of the second segment 13 of the updated software and/or with a software already existing in the second data memory 9 for operating the first vehicle device 2. An advantage of this is that, on the one hand, the segmented updated software is reassembled to form a single common updated software. On the other hand it can thus be ensured that already existing software, which is located in the second data memory 9 of the first vehicle device 2 and can be re-used in the context of the updated software, can be added to at least the first and/or second segment 12, 13. Thus, it is ensured in particular that a transmission of already existing segments of the, in particular updated, software no longer need to be transmitted.

In a final process step 108 the access by the first vehicle device 2 and/or the second vehicle device 3 is changed to the software which is updated by means of the software update.

In a preferred embodiment at least a portion of the first and/or the second segment is an updated file. The advantage of this is that the control device 4 does not need to check segments, in particular file segments, for their association to a specific file, thereby saving management effort and time expenditure in relation to the control device 4.

Preferably, the method 100 is carried out during at least one predetermined operating state of the control device 4 and/or the first vehicle device 2, in particular the second vehicle device 3. It can thus be ensured that the storage process is not carried out, for example, in safety-critical states of the control device 4 and/or the first vehicle device 2 and/or the second vehicle device 3, in particular of the vehicle 1.

More preferably, the storage of the first and second segments 12, 13, in particular a portion of the first segment 12 and a portion of the second segment 13, is carried out independently of a predetermined configuration and/or sequence of the segments. It can thus be ensured that, depending on various parameters such as the transmission rate of the received software update and/or the times of the read and/or write accesses, the control device 4 can optimize the storage process.

Ideally, the control device 4 and/or the first vehicle device 2 checks whether a segment of the software to be updated is already present in the second data memory 9. Thus, multiple write operations to the second data memory 9 with the same segment can be avoided, resulting in particular in time savings.

Preferably, the control device 4 is configured so as to decrypt the received segments of the software update, in case they are encrypted, and/or to authenticate them to verify an authenticity of the software update and prevent malicious software from entering the vehicle 1.

Further preferably, at least a part of the first and/or the second segment 12, 13 is at least one updated file. Thus, the processing effort of the control device 4 can be reduced, since this only updates the software at the file level.

Figure 2:
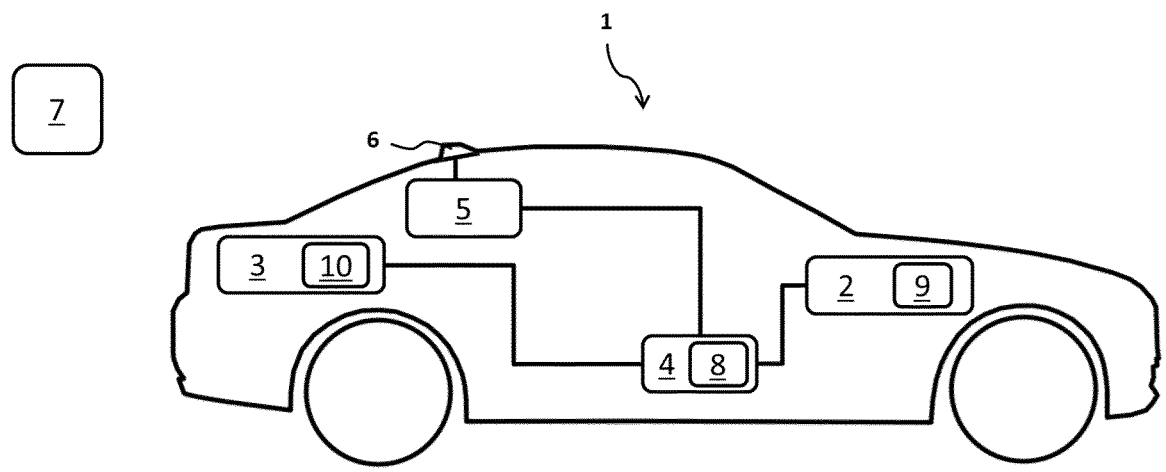
FIG. 2 illustrates an exemplary embodiment of a vehicle according to the invention having at least one device for updating software for operating vehicle devices.

FIG. 2 shows an exemplary embodiment of a vehicle 1 according to the invention having at least one device 11 for updating software for operating vehicle devices 2, 3.

The central control device 4, which comprises the first data memory 8, is arranged in the vehicle 1. The control device 4 is connected to the first vehicle device 2, which has the second data memory 9, and to the second vehicle device 3 which has the third data memory 10. The control device 4 is also connected to a communication device 5, which can communicate wirelessly with a backend server 7 using electromagnetic waves by means of an antenna 6 arranged on the roof of the vehicle 1.

The control device 4 is configured in such a way that a first segment 12 of a segmented updated software for operating the first vehicle device can be stored in the first data memory 8 and at least a part of the first segment 12 can be stored in a second data memory 9 of the first vehicle device 2 of multiple vehicle devices 2, 3 by moving or copying from the first data memory 8 into the second data memory 9.

Preferably, the first and/or second and/or third data memory 8, 9, 10 are implemented as non-volatile memory, preferably as a flash memory or a hard disk memory. In particular, the use of a flash memory is to be preferred in a vehicle 1 as a flash memory is at least substantially robust against vibrations which occur during the operation of the vehicle 1. Preferably, the data memory 8, 9, 10 can also be implemented as hard disk memories, since these have a better cost-storage ratio.

More preferably, the device 11 comprises the communication device 5, by means of which at least one segment of the updated software can be wirelessly received. It can thus be guaranteed that via the air interface, in particular via a mobile radio link, a software update can be received wirelessly so that the software update can be received without an additional workshop visit by the vehicle 1.

In particular, the plurality of vehicle devices 2, 3 can be assigned to a functional assembly, preferably in relation to driver assistance and/or communication and/or drive unit, in particular, all vehicle devices can be assigned to an entire assembly of a vehicle 1. Thus, a segment of the software update can be assigned to an assembly of vehicle devices 2, 3, so that the control device 4 requires less effort in terms of the management of the segments, since the segments no longer need to be individually assigned to the vehicle devices 2, 3 but can be assigned instead to a plurality of vehicle devices 2, 3.

Figure 3:
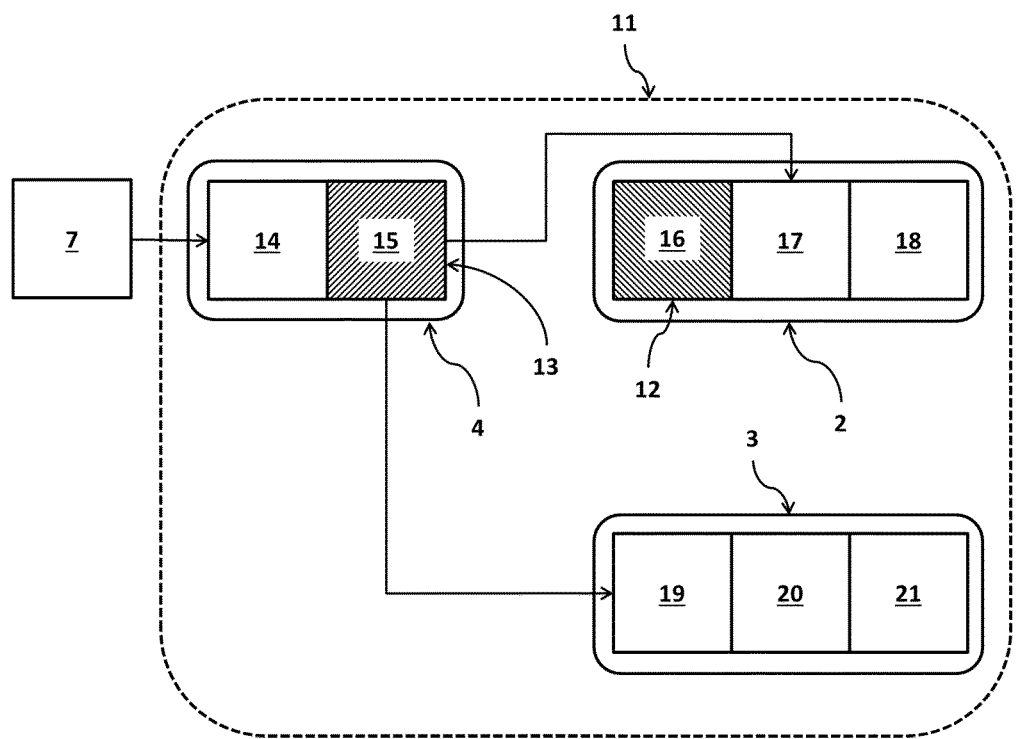
FIG. 3 illustrates an exemplary embodiment of a device according to the invention for updating software for operating vehicle devices.

FIG. 3 shows an exemplary embodiment of a device 11 according to the invention for updating software for operating vehicle devices 2, 3. Updated software is transmitted in segmented form from the backend server 7 to the control device 4, which is arranged together with the first and second vehicle device 2, 3 in the device 11 for updating software. In this process each segment of the updated software is stored in the first data memory 8 of the control device 4, wherein the data memory 8 is divided into a first and a second memory area 14, 15. Thus it can preferably be ensured that a first segment 12 of the updated software already received from the backend server 7, which is located in a memory area of the first data memory 8 of the control device 4, is transferred to at least one vehicle device and can be stored in the data memory thereof, wherein parallel to this storage process a second segment 13 can be received by the backend server 7 and stored in another memory area of the first data memory 8 of the control device 4.

The control device 4 additionally performs the task of assigning the individual segments, in particular only parts of these individual segments, to a first and/or a second vehicle device 2, 3 in order then to transmit the assigned segments to the first and/or second vehicle device 2, 3 and store them in their data memories 9, 10.

In this exemplary embodiment the second data memory 9 of the first vehicle device 2 is sub-divided into three different, in particular equal-sized, memory areas 16, 17, 18 and likewise the third data memory 10 of the second vehicle device 3 is divided into three different, in particular equal-sized, memory areas 19, 20, 21, wherein a first segment 12 of the updated software is already stored in the first memory area 16 of the second data memory 9. Preferably, this latter can also be a segment of the software for operating the first vehicle device 2, which was already present in the second data memory 9 of the first vehicle device 2 and did not require updating.

A second segment 13, which is temporarily stored in the first data memory 8 of the control device 4, is transmitted to a second memory area 17 of the first vehicle device 2 and stored therein. Preferably, the second segment 13 can also be stored in a first memory area 19 of the third data memory 10 of the second vehicle device 3, if the first and second vehicle device 2, 3 can be assigned to a functional assembly of vehicle devices 2, 3 and the second segment 13 is therefore preferably intended for both vehicle devices 2, 3. The second segment 13, which is still located in the first data memory 8 of the control device 4, is preferably deleted in the second memory area 15 of the first data memory 8 after being successfully stored in the respective assigned data memories 9, 10 of the vehicle devices 2, 3. This sequential process is carried out, in particular, until the updated software has been fully distributed to all vehicle devices 2, 3 and stored in their data memories 9, 10.

LIST OF REFERENCE NUMERALS 1 vehicle
2 first vehicle device
3 second vehicle device
4 control device
5 communication device
6 antenna
7 backend server
8 first data memory
9 second data memory
10 third data memory
11 device for updating software
12 first segment
13 second segment
14 first memory area of the first data memory
15 second memory area of the first data memory
16 first memory area of the second data memory
17 second memory area of the second data memory
18 third memory area of the second data memory
19 first memory area of the third data memory
20 second memory area of the third data memory
21 third memory area of the third data memory
100 method for processing at least one software update The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating software for operating vehicle devices, the method comprising:
   storing a first segment of a segmented updated software for operating a first vehicle device of a plurality of vehicle devices in a first data memory of a central control device; and
   storing at least a portion of the first segment in a second data memory of the first vehicle device by moving or copying from the first data memory into the second data memory;
   joining the portion of the first segment to at least one of a second segment of the updated software and a software already existing in the second data memory for operating the first vehicle device;
   storing at least a portion of at least one of the first segment and the second segment in a third data memory of a second vehicle device by moving or copying from the first data memory into the third data memory;
   wherein the method is carried out during at least one predetermined operating state of at least one of the control device and the first vehicle device;
   comparing the operating state of at least one of the control device, the first vehicle device and the second vehicle device with the predetermined operating state; and
   pausing the storage process of at least one of the first data memory of the control device, the second data memory of the first vehicle device, and the third data memory of the second vehicle device, when the current operating state of at least one of the control device and the first vehicle device does not correspond to the predetermined operating state.

2. The method according to claim 1, further comprising:
   segmenting the updated software into at least the first segment and the second segment.

3. The method according to claim 1, further comprising at least one of:
   testing at least one of the first data memory, the second data memory and the third data memory to determine whether or not the storage capacity is sufficient for storing at least one of the first segment and the second segment;

allocating at least one of the first segment and the second segment to at least one of the first vehicle device and the second vehicle device; and changing the access by at least one of the first vehicle device and the second vehicle device to the software which is updated by the software update.

4. The method according to claim 1, wherein at least a part of at least one of the first segment and the second segment is an updated file.

5. The method according to claim 1, wherein at least one part of at least one of the first segment and the second segment is at least one updated file.

6. The method according to claim 1, wherein the storage of a portion of the first segment and a portion of the second segment is carried out independently of a predetermined configuration and sequence of the segments.

7. An apparatus configured to update software for operating vehicle devices, the apparatus comprising:
 a control device, which has a first data memory; and
 a plurality of vehicle devices, each of which has an additional data memory;
 wherein the control device is configured in such a way as, during at least one predetermined operating state of at least one of the control device and a first vehicle device, to:
 store a first segment of a segmented updated software in the first data memory,
 store at least a portion of the first segment in a second data memory of the first vehicle device of the plurality of vehicle devices by moving or copying from the first data memory to the second data memory,
 join the portion of the first segment to at least one of a second segment of the updated software and a software already existing in the second data memory for operating the first vehicle device,
 store at least a portion of at least one of the first segment and the second segment in a third data memory of a second vehicle device by moving or copying from the first data memory into the third data memory,
 compare the operating state of at least one of the control device, the first vehicle device and the second vehicle device with the predetermined operating state, and
 pause the storage process of at least one of the first data memory of the control device, the second data memory of the first vehicle device, and the third data memory of the second vehicle device, when the current operating state of at least one of the control device and the first vehicle device does not correspond to the predetermined operating state.

8. The apparatus according to claim 7, wherein at least one of the first data memory and the second data memory is implemented as a flash memory or a hard disk memory.

9. The apparatus according to claim 7, further comprising:
 a communication device configured to wirelessly receive at least one segment of the updated software.

10. The apparatus according to claim 7, wherein the plurality of vehicle devices are assigned to a functional assembly in relation to at least one of a driver assistance, a communication and a drive of a vehicle.

11. A vehicle having an apparatus according to claim 7.

* * * * *